United States Patent [19]

Di Salvo et al.

[11] 3,900,252

[45] Aug. 19, 1975

[54] METHOD AND APPARATUS FOR ANALYZING HAIR STRUCTURE

[75] Inventors: Ronald M. Di Salvo, Marina Del Rey; Robert W. Yates, Woodland Hills, both of Calif.

[73] Assignee: RedKen Laboratories, Van Nuys, Calif.

[22] Filed: Oct. 31, 1973

[21] Appl. No.: 411,188

[52] U.S. Cl. .................. 353/39; 353/79; 353/97; 353/20
[51] Int. Cl. ............................................ G02b 21/36
[58] Field of Search .......... 353/39, 119, 79, 97, 55, 353/20, 75, 77

[56] References Cited
UNITED STATES PATENTS

| | | | |
|---|---|---|---|
| 1,961,803 | 6/1934 | Trout | 353/79 X |
| 2,170,967 | 8/1939 | Eppenstein et al. | 353/39 |
| 2,270,517 | 1/1942 | Drucker | 353/20 |
| 2,683,390 | 7/1954 | Steele | 353/79 |

FOREIGN PATENTS OR APPLICATIONS

| | | | |
|---|---|---|---|
| 322,320 | 7/1957 | Switzerland | 353/77 |
| 1,133,435 | 11/1956 | France | 353/39 |

*Primary Examiner*—Harry N. Haroian
*Attorney, Agent, or Firm*—Christie, Parker & Hale

[57] ABSTRACT

Analyzing of human hair by a projecting microscope mounted in a housing in which the light source is in the base of the housing for directing collimated light upwardly to a microscope mounted on the base. The cover for the microscope is hinged in a manner that allows the cover to be tilted through 90° to form a projection hood. A 45° mirror positioned on top of the eyepiece projects the image from the microscope to a screen mounted on the inside of the top of the cover when the cover is tilted to the hood position. Qualitative analysis is provided by exposing hair samples in the microscope to polarized light and passing the light through a quartz red filter to study the birefringence effects of the hair.

2 Claims, 4 Drawing Figures

METHOD AND APPARATUS FOR ANALYZING HAIR STRUCTURE

BACKGROUND OF THE INVENTION

This invention relates to a method and apparatus for analyzing the quality of human hair and more specifically relates to a projection microscope for visually displaying and photographing the structural qualities of hair.

It has become evident in recent years that the environmental conditions to which human hair is exposed has a deteriorating effect on the quality of the hair. Not only pollutants in the atmosphere but various chemicals and material used in the care of the hair, such as detergents, bleaches, colorings, conditioners, and the like, can have a damaging effect if improperly used. A need has developed for a system for analyzing human hair to determine its condition and to assist in the selection of a treatment for stabilizing or improving the hair condition.

SUMMARY OF THE INVENTION

The present invention is directed to an improved microscope and method of utilizing the microscope to provide a qualitative analysis of hair and as an aid in demonstrating properties of hair samples. In brief, the present invention provides a projecting microscope in which the optical system of the microscope is mounted vertically on a housing base which includes a light source and filter means illuminating a hair sample. A rigid cover fits onto the base and encloses the microscope. The cover is hinged such that the cover can be tilted to an open position in which a screen mounted inside the top of the cover is rotated to a vertical viewing position. The side walls of the cover form a hood which shields the screen from ambient light. A mirror mounted on the eyepiece of the microscope projects the image from the microscope onto the screen. A polarizing filter in the light source provides polarized light illumination of the sample; a second polarizing filter is mounted above the eyepiece together with a quartz red filter which allows viewing of the birefringent properties of the hair.

BRIEF DESCRIPTION OF THE DRAWINGS

For a more complete understanding of the invention, reference should be made to the accompanying drawings, wherein.

DETAILED DESCRIPTION

Figure 1:
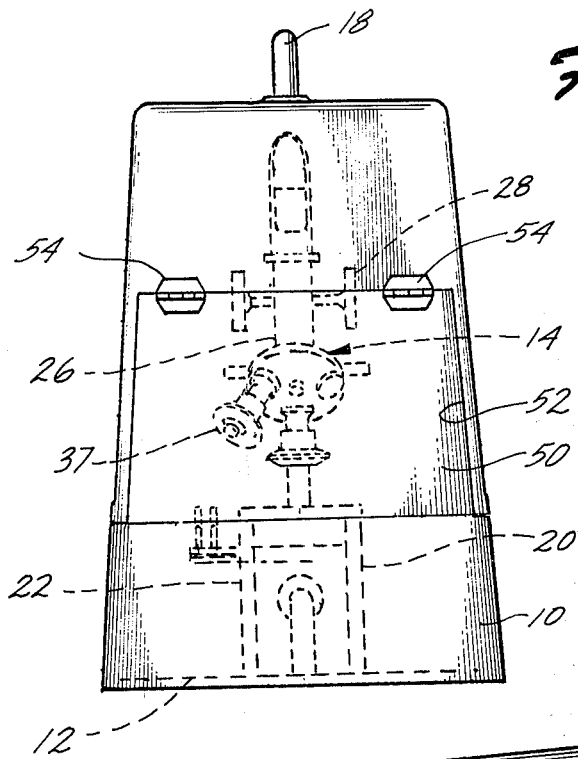
FIG. 1 is a rear view of the projection microscope with the cover closed.

Referring to the drawings in detail, the numeral 10 indicates generally the base housing of the projection microscope. The base housing, which is preferably molded of a reinforced plastic material, houses the light source for the projection microscope. The projection microscope assembly includes a metal base plate 12 on which is mounted a microscope indicated generally at 14. A cover 16 fits over the microscope 14 and onto the base housing 10. With the cover 16 in the closed position shown in FIG. 1, the projection microscope can be conveniently carried by a handle 18 secured to the top of the cover.

The microscope assembly 14 includes a pair of parallel frame members 20 and 22 which project upwardly from the base plate 12 within the housing 10. The supporting arm 24 of the microscope assembly 14 is rigidly held between the two frame members 20 and 22. The optical tube 26 of the microscope is attached to the frame arm 24 by a rack and pinion assembly 27 of conventional design which permits vertical adjustment of the optical tube 26 to achieve focusing by means of a course adjustment focusing knob 28 and fine adjustment focusing knob 30. The lower end of the microscope tube 26 is provided with the conventional turret assembly 32 by which objective lenses of different magnifying powers may be selectively rotated into alignment with the optical tube 26. Special light shields 37 are mounted on the objective lenses to reduce stray light from the light source in raising the ambient light level and distracting the operator. Since the microscope itself is of conventional design, further description of the details of this portion of the assembly is omitted for clarity.

A stage plate 34 is secured to the frame members 20 and 22 by screws 35 and is arranged to receive glass specimen slides for positioning directly below the optical tube 26. The specimen is illuminated from an electric light source 36 mounted on the base plate 12. A motor-driven fan (not shown) may be mounted within the housing base 10 to one side of the lamp 36 to provide cooling, if necessary. Suitable openings may be provided in the side of the base housing 10 to permit cooling air to be circulated through the housing base. Light from the lamp 36 is directed through a first condensing lens 40 mounted between the frame members 20 and 22. The condensing lens collimates the light from the lamp 36 into a substantially parallel beam which is directed horizontally within the base 10 onto the reflecting surface of a mirror 42 mounted between the frame members 20 and 22. The mirror which reflects visible light and passes infrared light is positioned to reflect the visible light upwardly through a second condensing lens 44 which focuses the light through an opening 46 in the specimen mounting plate 34 to illuminate the specimen slide. The light from the specimen is formed into an enlarged image by the optical system of the microscope 14 in a conventional manner.

According to one of the features of the present invention, the cover 16 of the microscope assembly is utilized as a support for a viewing screen and a hood for shielding the screen against ambient light. This is accomplished by mounting the cover to the base housing 10 by means of a hinge plate 50. The hinge plate 50 is rigidly secured to the top of the base housing 10 adjacent the back edge thereof. The back wall of the cover 16 is provided with a cut-out portion 52 which receives the hinge plate 50. The cover is attached to the top edge of the hinge plate 50 by a pair of hinges 54 which permit the cover to be tilted backwardly from its closed position about a horizontal axis through a 90° angle. The hinges 54 are designed to restrict the rotation so that the cover is held by the hinges in the open position such that the top of the cover is tilted to a substantially vertical position when the cover is fully opened. A projection screen 56 is mounted on the inside of the top of the cover 16.

Projection of the enlarged image of the hair specimen, either on the screen 56 or on some other viewing surface, is provided by a mirror 58 which is mounted on the top of the microscope by means of a mounting tube 60. The tube 60 is designed to slip over the eyetube 61 at the top of the tube 26. The mirror is mounted at a 45° angle to the optical axis of the microscope. The tube 60 is open along a substantial portion of its length, providing an opening both for the light reflected from the mirror 58 and also to permit rotation of a filter element 62, hereinafter described in detail, which may be fitted inside the tube 60 and over the top of the eyepiece of the microscope.

Figure 2:
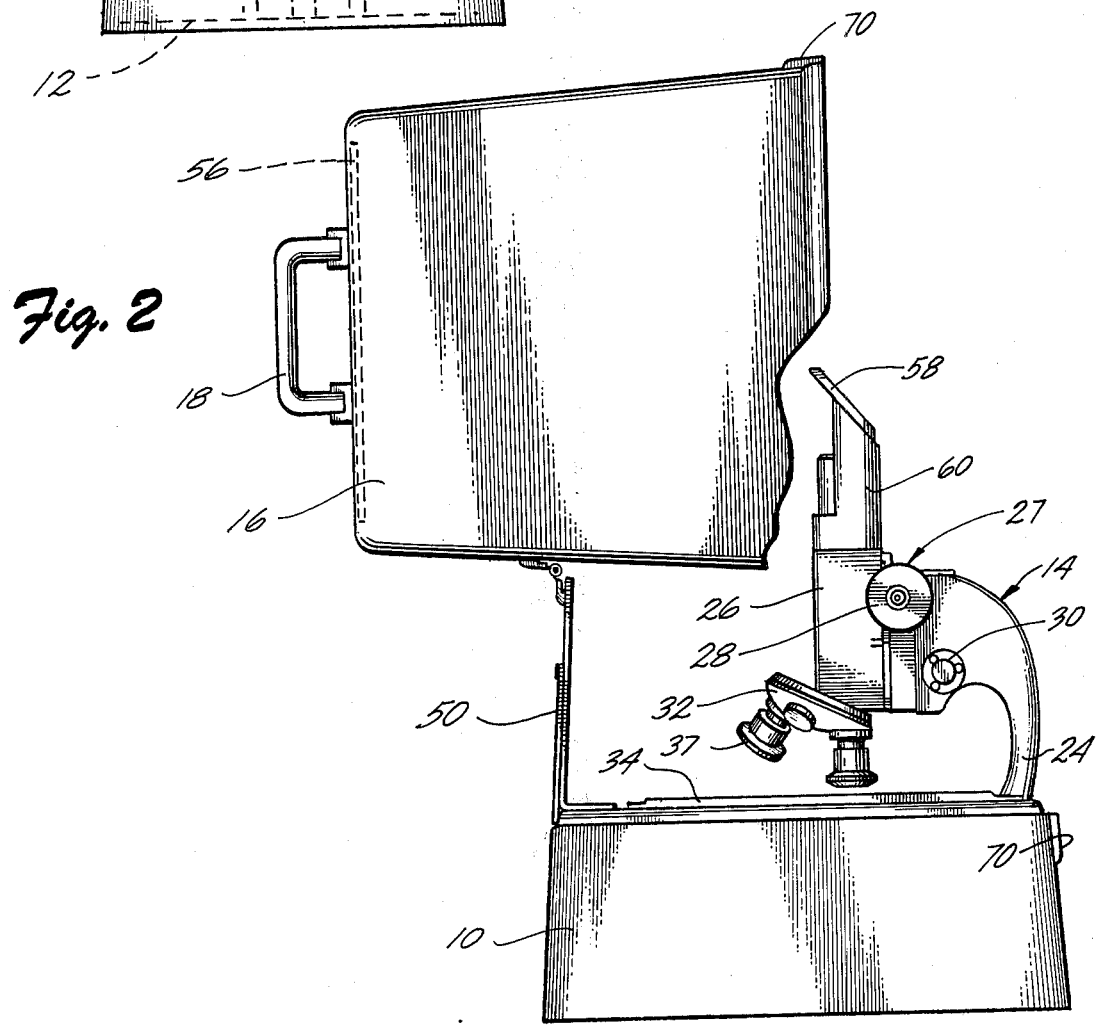
FIG. 2 is a side view of the projection microscope with the cover open.
Figure 4:
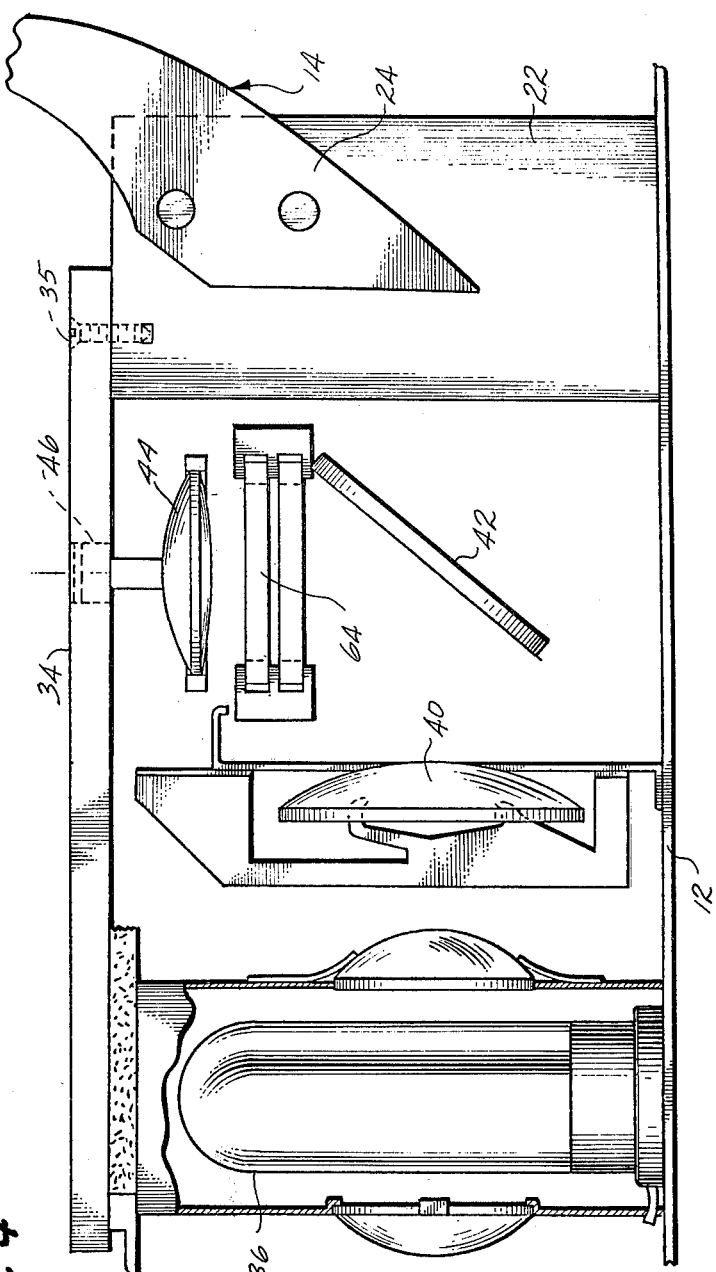
FIG. 4 is a sectional view of the light source analyzer filter assembly in the base.
Figure 3:
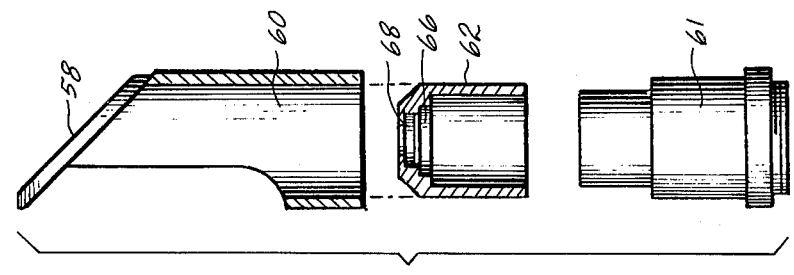
FIG. 3 is a detailed sectional view of the projecting mirror and filter assembly for mounting on the eyepiece of the microscope.

With this arrangement, as shown in FIG. 2, the cover of the microscope, when tilted back on the hinges 54, provides a hood or light shield which supports the screen 56 in viewing position and at the same time shields the screen from much of the ambient light. The inside of the cover is preferably painted black to reduce reflection of stray light. The mirror 58 directs light from the enlarged image formed by the microscope onto the screen 56, permitting the enlarged image of the specimen to be viewed by several people at a time. The mirror can be rotated in position to direct the reflected light onto a wall or a larger screen in a darkened room to provide viewing by even a larger number of people.

The mirror can be removed and replaced with a camera which will photograph the image. The microscope as thus far described, while having general application as a projection microscope, is of particular interest in making a qualitative analysis of human hair and has proved particularly useful to dermatologists, beauticians, and other persons who are involved in the care and treatment of hair for analyzing a person's hair and at the same time displaying an enlarged image of the hair to the person whose hair is being analyzed.

Qualitative analysis of hair condition is achieved by examining the birefringence of the hair specimen using polarized light. This is accomplished by inserting a polarizing filter 64 in the path of the light from the illuminating source 36 below the condensing lens 44. This polarizer is oriented at 45° to the axis of the hair. The filter element 62 includes a quartz red filter 66 and a polarizing analyzer filter 68. The two polarizing filters are cross-polarized. The red filter is situated on its C axis and oriented at 45° to the polarizer 68 to give maximum color contrast and intensity to the hair. It has been found that major structural flaws or defects in the hair become obvious when viewed through the analyzer filter. Specifically, when viewing the hair under this optical system, a greenish-blue color of the hair's cortex structure indicates a compact protein structure of maximum structural strength. A reddish color of the hair's cortex structure indicates a weakening of the hair's internal structure. A yellowish color of the hair's cortex structure indicates the weakest possible condition.

From the above description, it will be appreciated that the present invention provides a compact projection microscope which can be used for displaying and analyzing specimens of hair to determine the structural properties of the hair samples. The microscope can be used for direct viewing in the conventional manner, or can be readily adapted to provide a visual display of the enlarged image on a self-contained screen. The housing arrangement permits the cover to be used as a viewing screen and light shield or hood without removal of the cover from the microscope base. When the cover is swung into the closed position a suitable clasp 70 on the front of the cover and on the front of the base housing locks to hold the cover securely and tightly closed, permitting the entire unit to be portably transported by the handle 18 on the top of the cover 16.

What is claimed is:

1. A projection microscope comprising a base, a light source mounted in the base, a microscope mounted on top of the base, the microscope having a vertically extending optical system with an eyepiece at the top, means directing light from the source to illuminate a sample positioned below the microscope and through the optical system of the microscope, means including a mirror mounted on the top of the microscope directing the light from the image formed by the microscope from a vertical to a horizontal path, a rigid cover fitting over the microscope and having walls surrounding the microscope on three sides and the back, the walls extending upwardly from the base to a top wall extending above the microscope when the cover is closed, the cover having a projection screen mounted inside the top wall of the cover, and hinge means connecting the wall at the back of the cover to the base, the cover being tiltable to an open position with the screen positioned vertically, the mirror directing light from the eyepiece onto the screen with the cover in the open position, the hinge means including a back plate secured to the base and extending upwardly above the base, the back wall of the cover having an opening for receiving the back plate, the back plate closing the opening when the cover is closed, and hinges connecting the top of the back plate to the back wall of the cover at the upper margin of said opening, the hinge axis being positioned substantially above the base intermediate the top wall and the bottom of the side walls of the cover, whereby the three sides of the cover when tilted to the open position about the hinge axis partly shield the top and sides of the microscope from stray light.

2. Apparatus of claim 1 further including polarizing means mounted in the base in the path of light from the source for plane-polarizing light entering the microscope, polarizing means rotatably mounted at the top of the microscope along the optical axis, and a quartz red filter means mounted with the polarizing means at the top of the microscope.

* * * * *